United States Patent Office 3,380,880
Patented Apr. 30, 1968

3,380,880
THERMOPLASTIC MATRIX
John B. Wheeler III, Somerville, N.J., assignor to Union Carbide Corporation, a corporation of New York
No Drawing. Filed July 23, 1965, Ser. No. 474,504
4 Claims. (Cl. 161—184)

ABSTRACT OF THE DISCLOSURE

A reformable thermoplastic matrix having thermal and dimensional stability and uniform mold shrinkage against which printing plates and the like can be molded, formed from a sheet of thermoplastic polyarylene polyether of the poly-(2-dimethylphenoxy-1,4)ether type.

---

This invention relates to a thermoplastic matrix against which polymeric material can be molded to produce printing plates, sound records, and the like, and to a process for forming such items. More particularly this invention relates to a reformable thermoplastic matrix characterized by uniform mold shrinkage in all directions and thermal and dimensional stability at molding temperatures of up to 350° F.

Compositions in sheet form comprising a fibrous base and a thermosetting synthetic resin binder, suitable for forming into matrices, are disclosed in U.S. Patents 2,278,291 to Swann et al. and 2,509,499 to Higgins. However, several problems have become associated with forming matrices from these compositions and molding articles, especially printing plates, from the matrices.

One such problem has been poor reproduction of the pattern or original printing plate against which a matrix is formed, especially the fine screen half-tone dots with screen rulings of 120 lines per inch or more where it is difficult to get sufficient depth in the shadow areas to prevent them from being filled in with ink on the printing press. This is due in general to the non-homogeneous character of the sheet composition and specifically to fiber shear during forming of a matrix. Another problem is dimensional instability due to the presence of moisture in the compositions. Moisture also causes a sheet to non-uniformly shrink in different directions upon forming a matrix, leading to poor reproduction of the original. Furthermore, shrinkage varies from sheet to sheet which makes color registration between plates of a set difficult to obtain. Because the sheets are made up of dissimilar components having different coefficients of thermal expansion, warping of the matrix during use has been yet another problem.

The use of a thermosetting binder for the fibrous base requires long cure cycles which effects the efficiency of the matrix forming operation. Insufficient cure of the thermosetting resin results in picking of the matrix surface which cuts down on the usable life of the matrix. Because the thermosetting binder is cured to the infusible state, the matrix cannot be reused to form other matrices. Furthermore, it has been observed that compositions incorporating a thermosetting binder deteriorate at temperatures of 350° F. to 400° F.

Thermoplastic materials which are fabricated by conventional techniques are generally not available for use as a matrix because they exhibit poor thermal and dimensional stability at elevated temperatures normally encountered in matrix molding. It has been determined that the maximum practical use temperature for a thermoplastic material as a matrix under normal molding conditions is about 40–50° F. below the glass transition temperature of a polymer. In the case of high performance polymers such as polycarbonate resin which has a glass transition temperature of 302° F., this maximum use temperature is about 250° F. At temperatures in excess of 250° F., the tensile modulus and tensile strength of polycarbonate drops off rapidly which renders this resin unsuitble for use as a matrix at molding temperatures in excess of about 250° F.

The present invention overcomes all of the aforementioned problems associated with fibrous based, thermosetting synthetic resin compositions by providing a matrix which permits excellent reproduction of an original, including fine screen half-tone dots. The matrix of the present invention eliminates the problems of dimensional instability, non-uniform shrinkage and warping heretofore met with fibrous based, thermosetting synthetic resin compositions. Furthermore, because the matrix of the present invention does not include a thermosetting synthetic resin binder, problems such as long cure cycles, picking of the matrix surface, and non-resusability are also eliminated. The matrix of the present invention is formed from a sheet of thermoplastic material by any of the fabrication techniques known for thermoplastic materials, yet the matrix so formed does not suffer from problems usually met with thermoplastic materials, namely poor thermal and dimensional stability at elevated temperatures normally encountered in molding with a matrix.

Broadly, the matrix of the present invention, which is formed from a sheet of thermoplastic polyarylene polyether, exhibits uniform mold shrinkage in all directions of 0.7% and less, is characterized by being thermally and dimensionally stable at molding temperatures of up to 350° F., and is reformable as herein described. Thermoplastic polyarylene polyether is described in detail below.

Another embodiment of the present invention is a matrix formed from a composite sheet of fiber-reinforced thermoplastic polyarylene polyether which comprises at least one fibrous layer bound between layers of thermoplastic polyarylene polyether, and the matrix so formed exhibits uniform mold shrinkage in all directions of 0.7% and less, is reformable and is characterized by being thermally and dimensionally stable at temperatures of up to 350° F., with the further proviso that the thickness of the thermoplastic polyarylene polyether at the surfaces of the composite sheet is thicker than the deepest impression made into it during the formation of a matrix.

Mold shrinkage, as indicated above, is a particular problem associated with fibrous based, thermosetting synthetic resin sheet compositions. With this composition, mold shrinkage is non-uniform in different directions for a given matrix and this non-uniformity varies in degree from matrix to matrix. A certain amount of mold shrinkage, that is the decrease in size of a matrix as compared to the original pattern after being formed therefrom, can be tolerated in amounts up to 0.7%, but, more importantly, it is essential and highly desirable that mold shrinkage be uniform from matrix to matrix and for each matrix, uniform in all directions. The matrix of the present invention possesses just this capability. The matrix offers a true reproduction of the original pattern with a tolerable uniform reduction in size which is the same from matrix to matrix. Prior matrices do not even approach this degree of uniformity.

Another specific embodiment of the matrix of the present invention is that it is capable of being reformed. This is accomplished by forming a first matrix by contacting a sheet of thermoplastic polyarylene polyether with a first pattern and applying heat and pressure, and thereafter forming a second matrix by contacting the back of the first matrix with a second pattern and applying heat and pressure. The first matrix is obliterated in the process and forms the smooth back of the second matrix. This process can be repeated several times to form two, three, four or more different or identical matrices from the same sheet of thermoplastic polyarylene polyether.

Broadly, the process of the present invention for forming a polymeric replica, such as a printing plate, sound record, or the like, of an original tangible shape comprises forming, preferably molding, a thermoplastic polyarylene polyether against the tangible shape thereby forming a self-supporting matrix (negative replica) of the shape, separating the thus formed polyarylene polyether matrix or negative replica from the shape, forming a polymeric material against the polyarylene polyether matrix and removing the thus formed polymeric replica. Because the polyarylene polyether does not undergo any thermal or dimensional degradation at temperatures used to form or mold thermoplastic materials, which is contrary to what would be expected from the behavior of prior thermoplastic materials, a polymeric replica of an original tangible shape, true in every detail, can be formed quickly and efficiently. Thereafter, as many replicas as desired can be formed. When the polyarylene polyether negative replica has served its purpose, because it is a thermoplastic material, it can readily be reformed or remolded into a second negative replica of a different tangible shape and so on.

The polyarylene polyethers used in this invention are thermoplastic polymers composed of recurring units having the formula

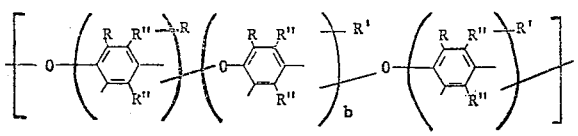

where the free valence of the terminal oxygen atom of one unit is connected to the free valence of the terminal benzene nucleus of the adjoining unit, $b$ is an integer of from 0 to 1 inclusive, R is a monovalent substituent selected from the group of hydrocarbon radicals, halohydrocarbon radicals having at least 2 carbon atoms, alkoxy radicals and haloalkoxy radicals having at least 2 carbon atoms, R' and R'' are the same as R and in addition hydrogen. Suitable polyarylene polyethers have an intrinsic viscosity of at least 0.07. Intrinsic viscosity is determined by dissolving the polymer in a good solvent for the polymer. A good solvent is defined as a solvent which will produce solutions of various concentrations such that when the viscosity is plotted against concentration, a straight line is obtained. Extrapolation of this line to zero concentration gives the intrinsic viscosity. See Buck et al. High Molecular Weight Organic Compounds, Interscience Publishers, Inc., New York (1949), pp. 75–110.

Typical examples of the monovalent hydrocarbon radicals that R, R' and R'' may be are alkyl, including cycloalkyl, for example methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octyldecyl, and so forth; alkenyl, including cycloalkenyl, for example, vinyl, allyl, butenyl, cyclobutenyl, isopentenyl, cyclopentenyl, linolyl, etc.; alkynyl, for example propargyl, etc.; aryl, including alkaryl, for example, phenyl, tolyl, ethylphenyl, xylyl, naphthyl, methylnaphthyl, etc., aralkyl, for example, benzyl, phenylethyl, phenylpropyl, tolylethyl, etc. The monovalent halohydrocarbon radicals may be the same as the hydrocarbon radicals, as outlined above, except methyl, wherein one or more of the hydrogen atoms are replaced by halogens, examples of which are chloroethyl, bromoethyl, fluoroethyl, dichloroethyl, bromoethyl, fluoroethyl, dichloroethyl, bromo propyl, dichlorodifluoroethyl, difluoroiodoethyl, bromobutyl, fluoroamyl, chlorovinyl, bromoallyl, fluoropropargyl, mono-, di-, tri-, tetra- and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent alkoxy radicals are methoxy, ethoxy, propoxy, isopropoxy, butoxy, secondary butoxy, tertiary butoxy, amoxy, hexoxy, octoxy, decoxy, vinoxy, alloxy, butenoxy, propargoxy, benzoxy, phenylethoxy, phenylpropoxy, tolylethoxy, etc. The monovalent haloalkoxy radicals may be the same as the above oxyhydrocarbons except methoxy, where one or more of the hydrogens are replaced by a halogen, for example, fluorine, chlorine, bromine, or iodine, a few typical examples of which are chloroethoxy, bromoethoxy, fluoroethoxy, dichloroethoxy, bromopropoxy, difluorochloroethoxy, iodobutoxy, fluoroamoxy, chlorovinoxy, bromoalloxy, fluoropropargoxy, bromobenzoxy, chlorophenylethoxy, phenylchloroethoxy, bromotolylethoxy, etc. Preferably R' and R'' are each hydrogen, R is a hydrocarbon radical of from 1 to 10 carbon atoms and the phenoxy substituent is in the para position.

Thermoplastic polyarylene polyethers of the class described herein can be prepared by reacting oxygen and an aryloxy-substituted monohydric phenol in the presence of a catalyst comprising a tertiary amine and a cuprous salt. A detailed description of the preparation of these polymers is contained in U.S. Patent 3,134,753, which is incorporated herein by reference.

Sheets of thermoplastic polyarylene polyether suitable for forming into the matrix of the present invention can be fabricated by any known thermoplastic forming technique such as extruding, compression molding, injection molding, solution casting and the like. The thickness of sheets employed is not critical but is rather governed by practical considerations such as cost and ease of forming. In general, the most useful range of thickness for thermoplastic polyarylene polyether sheets is from about 0.030 inch to about 0.250 inch while the range of from about 0.080 inch to about 0.125 inch is preferred.

As indicated above, the matrix of the present invention can be formed from a composite sheet of fiber-reinforced thermoplastic polyarylene polyether with the proviso that the thickness of the thermoplastic polyarylene polyether at the surfaces of the composite sheet is thicker than the deepest impression made into it during the formation of a matrix. To this end, any fiber reinforcing material can be used. Examples of such reinforcement are woven and unwoven fibrous cloth, fibrous mats and bats, continuous fibrous filaments and strands, and the like. Fiberglass, especially in the form of a thin mat or woven cloth, has been found to perform well. The use of fiber reinforcement adds strength to a matrix thereby extending its useful life and reduces uniform mold shrinkage down to levels as low as 0.1%.

One or more layers of the same or different fiber reinforcement can be utilized if desired. It is also desirable that the fiber reinforcement used be sufficiently porous or open to allow for complete impregnation thereof by thermoplastic polyarylene polyether during formation of the sheet and matrix.

As stated above, the thickness of the thermoplastic polyarylene polyether at the surfaces of the composite sheet is thicker than the deepest impression made into it during the formation of a matrix. This arrangement permits for excellent reproduction of an original in a homogeneous portion of the composite sheet and eliminates the problem of poor reproduction due to fiber shear. Stated in different terms, the material at the surfaces of a composite sheet is free from interfering fiber reinforcement.

A composite sheet whereby a layer or layers of fiber reinforcement is bound between layers of thermoplastic can conveniently be prepared by interposing a layer of fiber reinforcement between two sheets of thermoplastic polyarylene polyether and applying heat and pressure to compact the layers into a single composite fiber reinforced sheet. A composite sheet having two or more layers of fiber reinforcement can be prepared in a similar manner by interposing a film or thin sheet of thermoplastic polyarylene polyether between fiber layers, thereafter interposing the sandwich construction so formed between two layers of thermoplastic polyarylene polyether and applying heat and pressure to compact the layers into a single composite fiber reinforced sheet. Other methods can be used such as extruding and joining two sheets of thermoplastic polyarylene polyether while interposing a layer of fiber reinforcement prior to joining the sheets. Other methods of preparing a composite sheet which insures that the thickness of the thermoplastic polyarylene polyether at the surfaces of the composite sheet will be thicker than the deepest impression made into it during the formation of a matrix can be used as will be evident to those skilled in the art. Usable thickness ranges for the composite sheet are the same as those given for a sheet of polyarylene polyether.

The matrix of the present invention is generally formed by contacting a sheet or composite sheet of thermoplastic polyarylene polyether described herein with an original plate or pattern, applying heat and pressure, separating the matrix and original and allowing the matrix to cool. In this manner, excellent reproduction of the original is obtained in the matrix against which true duplicates of the original can be molded as described infra.

The temperature at which a matrix can be formed is not narrowly critical. Obviously, the lowest temperature will be the temperature at which the polymer can be formed under pressure, and the highest temperature will be below the decomposition temperature of the polymer or softening point of the original. Temperatures ranging from 445° F. to 590° F., preferably 455° F. to 505° F. meet these practical criteria for the thermoplastic polyarylene polyether. Matrices can be formed from unmounted copper originals at temperatures of 445° F. to 590° F., and from zinc and magnesium originals at temperatures of 445° F. to 505° F.

Molding pressure can vary widely. Useful pressures range from 200 p.s.i. to 4000 p.s.i., preferably from 250 p.s.i. to 1200 p.s.i.

As indicated previously, the matrix of the present invention is characterized by uniform mold shrinkage in all directions and by thermal and dimensional stability at molding temperatures of up to 350° F. In general, it has been found that sheets of thermoplastic polyarylene polyethers described herein will shrink when formed into a matrix in an amount of from about 0.1% to about 0.7%. It is to be noted that a unique feature of the matrix of the present invention is that the degree of shrinkage for each matrix formed from sheets of thermoplastic polyarylene polyether having like properties, e.g. the same reduced viscosity, will be the same, that is, uniform from sheet to sheet, and uniform in all directions within each sheet. This feature enables a matrix fabricator to rely on a uniform recurring degree of shrinkage for a given polymer formulation, and hence obtain overall constantly superior results.

For purposes of illustrating the thermal and dimensional stability of the matrix of the present invention, Table I below lists comparative physical properties for matrices formed from thermoplastic polyarylene polyether having the following recurring units

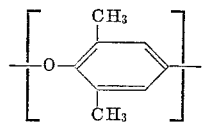

polyhydroxyether, which is a bisphenol A polyhydroxyether of the structure

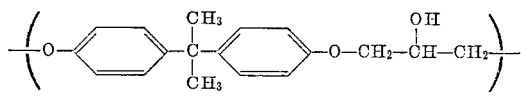

and polycarbonate which is a bisphenol A polycarbonate of the formula

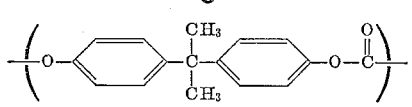

TABLE I

| | Polyarylene Polyether | Matrix Formed From— | |
| --- | --- | --- | --- |
| | | Polyhydroxyether | Polycarbonate |
| Tensile Modulus, p.s.i. | 350,000 | 280,000 | 340,000 |
| Tensile Strength, p.s.i. | 10,500 | 8,000 | 10,000 |
| Glass transition Temp, ° F. (Tg) | 410 | 212 | 302 |
| Heat Distortion, ° F, at 264 p.s.i. | 375 | 185 | 270 |

Table I demonstrates that the matrix of the present invention can be used to mold duplicate polymeric members at temperatures of up to about 350° F. and higher whereas, polyhydroxyether and polycarbonate can only be used at temperatures of up to about 160° F. and 250° F. respectively. However, most molding with a matrix is conducted at temperatures in excess of about 250° F. which renders polyhydroxyether and polycarbonate unsuitable for general matrix use. The matrix of the present invention provides the versatility of thermoplastic materials yet is capable of withstanding the rigors of molding with a matrix without the problems currently met with thermosetting resin formulations and contrary to what has generally been thought of with respect to the high temperature capabilities of thermoplastic materials.

Polymeric material which can be molded against the matrix of the present invention to produce printing plates and the like can be either a thermoplastic, thermosetting, natural or synthetic polymeric material. In general, any normally solid polymeric material which is capable of being compression molded or cured by the application of pressure and heat up to about 350° F. and higher can be molded against the matrix of the present invention.

Suitable thermoplastic materials include natural and synthetic rubbers, polyolefins such as polyethylene and polypropylene, polyvinylidene chloride, polyvinyls, polystyrene, polyethers, polyacrylates, polymethacrylates, polyamides, polycarbonates, polyhydroxyethers, polyoxymethylenes, copolymers and mixtures thereof, and the like.

Suitable thermosetting resins include phenol-aldehyde polymers, urea-aldehyde polymers, melamine-aldehyde polymers, epoxy resins, polyesters, copolymers and mixtures thereof, and the like.

Polymeric materials moldable against the matrix of the present invention can contain any well known additive such as fillers, dyes, pigments, cross-linking agents, curing agents, stabilizers, plasticizers, preservatives, lubricants, anti-oxidants, and the like. However, polymeric molding formulations should not contain solvents or other materials which attack the thermoplastic polyarylene polyether matrix. Aromatic and chlorinated solvents fall into this class and their use should be avoided. In general, any component which is inert with respect to the matrix and the polymer molded against the matrix can be included in a molding formulation.

In general, the matrix of the present invention separates readily from an original or duplicate member without the aid of a mold release agent. However, if desired, mold release agents can be used to effect separation between the matrix and original or duplicate member. The use of release agents has been found to be desirable when molding duplicate members from crosslinked polymeric materials such as epoxy resins and rubbers. Suitable mold release agents are graphite, molybdenum disulfide, silicone oils, and the like. The use of solvents or agents which attack the matrix material should be avoided.

Specific examples of suitable techniques for molding duplicate members from the matrix of the present invention are given in the examples below.

The following ASTM procedures were followed in obtaining physical data reported herein.

| | ASTM |
|---|---|
| Tensile modulus | D638–60T |
| Tensile strength | D638–60T |
| Heat distortion temperature | D1637–59T |

Glass transition temperature (Tg), commonly referred to as second order phase transition temperatures, refers to the inflection temperatures found by plotting the resilience (recovery from 1 percent elongation) of a film ranging in thickness from 3–15 mils against the temperature. A detailed explanation for determining resilience and inflection temperature is to be found in an article by Alexander Brown, Textile Research Journal, volume 25, 1955, at p. 891.

Mold shrinkage relates the change in dimensions of three selected pairs of marks scribed on a metal original pattern to the dimensions of these same pairs of marks as they are molded into a matrix. This change in dimension is then expressed as a percentage of the dimension of pairs of marks scribed on an original. Mold shrinkage as reported herein was calculated using two pairs of marks parallel to each other and at opposite edges of an original and a third pair of marks on the edge of the original at right angles to the other two pairs. Measurements were made using a micrometer caliper, reading in thousandths of an inch, which was registered on the marks under a 10 power magnifying glass first on the original and then on the matrix formed therefrom. A maximum variance of ±0.1% is encountered in this method of measuring mold shrinkage.

The following examples are illustrative of the present invention and are not intended to limit the same in any manner. All parts and percentages are by weight unless indicated otherwise.

Example 1.—Preparation of thermoplastic polyarylene polyether

Oxygen is passed for a few minutes through a mixture of 0.4 g. of cuprous chloride and 30 ml. of pyridine to aid in the dissolving of the cuprous salt. Four grams of 2,6-dimethyl-4-(2',6'-dimethylphenoxy)phenol is added to the mixture. Oxygen is passed therethrough at a rate fast enough to provide an excess over that being adsorbed with vigorous stirring. The initial temperature is 29.5° C. and rises to 51.5 during a 3 minute reaction period. Thereafter 360 ml. of an aqueous 2 N solution of HCl is added to precipitate the polymer. The polymer is then dissolved in chloroform and precipitated by adding dropwise to methanol containing 1% by volume of 12 N HCl. This last purification step is repeated. The solid product is poly-(2,6-dimethylphenylene-1,4)ether composed of recurring units having the formula

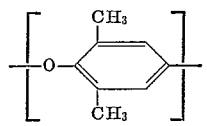

The isolated polymer has an intrinsic viscosity of 1.22.

Example 2.—Forming a matrix and molding against the same

Thermoplastic polyarylene polyether pellets prepared as in Example 1 were vacuum stripped for 3 hours at 300° F. The pellets were then compression molded at 490° F. in an electrically heated hydraulic press into a plaque measuring 8″ x 8″ x ⅛″. The plaque was then contacted with a copper original relief printing plate coated with a silicone mold release oil and placed in an electrically heated hydraulic press having a four inch ram. The plaque and original were preheated at 490° F. for three minutes at zero pressure with the press platens closed. The thermoplastic matrix was then formed by applying 1250 p.s.i. for one minute. The temperature was reduced to 200° F. and the original and matrix removed and cooled to room temperature. The resultant matrix was flat and had perfect reproduction of detail including small dots in the 150 lines per inch screens. The matrix formed was measured and was found to have uniformly shrunk in all directions 0.63% from the copper original.

An intimate mixture of polyhydroxyether of the structure

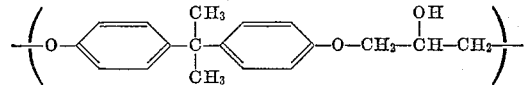

and 5% by weight of rubber comprised of 95% butadiene and 5% styrene was molded against the matrix formed using the press described above. In each instance, the matrix and polymer mixture in contact therewith were preheated at 300° F. for three minutes under zero pressure with the press platens closed. Duplicate printing plates were then molded at 935 p.s.i. for 30 seconds. In each instance an excellent duplicate plate was obtained without any thermal or dimensional degradation of the matrix.

Example 3

Polybutadiene-acrylonitrile (Buna N) rubber, polybutadiene-styrene (GRS) rubber, polyisobutylene ("Butyl") rubber, polychloroprene (Neoprene) rubber and natural rubber commercial flexible printing plate compositions were molded against a matrix prepared as in Example 2 into duplicate printing plates of excellent quality. The plates were molded as in Example 2 using a one and one-half minute preheat at 300° F. and zero pressure, and then 500 p.s.i. at 300° F. for 10 minutes to cure the plates. Mold stops were employed to produce 0.065 inch thick plates. The formulations did not crack or craze the matrices which were otherwise unchanged.

Example 4.—Forming several matrices from a single sheet

A matrix was formed as described in Example 2. The matrix was successfully used to mold a duplicate member as described in Example 2. The back of this matrix was then contacted with a copper original relief printing plate and a second matrix was formed in the same manner as the first. The first matrix was completely obliterated and the second matrix formed shrunk 0.63% uniformly in all directions compared to the copper original. Reproduction of detail was perfect. A duplicate plate was successfully molded as in Example 2. A third, fourth and fifth matrix was formed by successively contacting the back of the previous matrix with a copper original and forming carried out in the same manner as the first and second matrix. The third, fourth and fifth matrices formed shrunk 0.63% uniformly in all directions compared to the copper original. Reproduction of detail was again perfect.

This example demonstrates a unique capability of the matrix of the present invention. The advantages of this are obvious. It enables a printer or fabricator to reuse the same sheet several successive times thereby greatly reducing costs and inventory.

Example 5

Thermoplastic polyarylene polyether having the formula

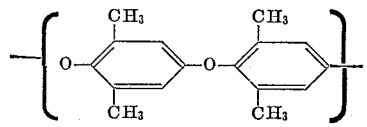

is prepared from 2,6-dimethyl-4-(2'-methylphenoxy)-phenol according to the procedure of Example 1. This polymer is then formed into a matrix from a copper original as in Example 2. Reproduction of the original is excellent and shrinkage was 0.63% and uniform in all directions.

A butadiene-styrene rubber duplicate plate is molded against the matrix as in Example 2. Reproduction is excellent and the matrix shows no thermal or dimensional degradation.

A duplicate plate is also molded from the polyhydroxyether-rubber formulation as in Example 2. Again reproduction is excellent and the matrix shows no thermal or dimensional degradation.

Example 6

Thermoplastic polyarylene polyether having the formula

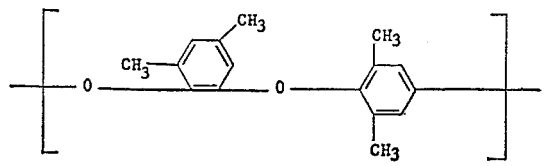

is prepared from 2,4-dimethyl-6-(2',6'-dimethylphenoxy)-phenol according to the procedure in Example 1. This polymer is then formed into a matrix from a copper original as in Example 2. Results were the same as in Example 2.

A butadiene-styrene rubber duplicate plate is molded against the matrix as in Example 2. Reproduction is excellent and the matrix shows no thermal or dimensional degradation.

A duplicate plate is also molded from the polyhydroxyether-rubber formulation as in Example 2. Again reproduction is excellent and the matrix shows no thermal or dimensional degradation.

Example 7

Thermoplastic polyarylene polyether having the formula

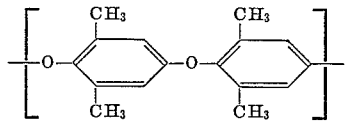

is prepared from 2,6-dimethyl-4-(2'-n-propyl-6'-methylphenoxy)phenol according to the procedure in Example 1. This polymer is then formed into a matrix from a copper original as in Example 2. Reproduction is excellent and shrinkage 0.64%, uniform in all directions.

A butadiene-styrene rubber duplicate plate is molded against the matrix as in Example 2. Reproduction is excellent and the matrix shows no thermal or dimensional degradation.

A duplicate plate is also molded from the polyhydroxyether-rubber formulation as in Example 2. Again reproduction is excellent and the matrix shows no thermal or dimensional degradation.

Example 8

Thermoplastic polyarylene polyether having the formula

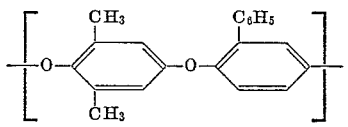

is prepared from 2,6-dimethyl-4-(2'-phenylphenoxy)phenol according to the procedure in Example 1. This polymer is then formed into a matrix from a copper original as in Example 2. Reproduction is excellent and shrinkage 0.63%, uniform in all directions.

A butadiene-styrene rubber duplicate plate is molded against the matrix as in Example 2. Reproduction is excellent and the matrix shows no thermal or dimensional degradation.

A duplicate plate is also molded from the polyhydroxyether-rubber formulation as in Example 2. Again reproduction is excellent and the matrix shows no thermal or dimensional degradation.

Example 9.—Making fiber reinforced matrix

Thermoplastic polyarylene polyether from Example 1 is formed into sheet 0.070 inch thick. Two plaques measuring 8″ x 8″ are cut from the sheet and are placed on top of one another with a 0.090 inch layer of fiberglass cloth interposed between them. The sandwich-like construction is place in an electrically heated hydraulic press and preheated at 570° F. for 5 minutes at zero pressure with the press platens closed. A pressure of 500 p.s.i. is then applied for 2 minutes to compact the layers into a composite sheet comprising a layer of fiberglass cloth bound between two layers of thermoplastic polyarylene polyether. The composite sheet is removed from the press and allowed to cool. The composite sheet has a thickness of 0.150 inch and the material underlying the surfaces was composed entirely of thermoplastic polyarylene polyether.

The composite sheet is formed against a copper original to form a matrix as in Example 2. Reproduction is excellent and shrinkage 0.2%, uniform in all directions. A duplicate plate is successfully molded against the matrix as described in Example 2. Reproduction is excellent and the matrix shows no thermal or dimensional degradation.

Example 10

Three layers of thermoplastic polyarylene polyether film from Example 1 0.04 inch thick are alternated with two layers of non-woven fiberglass swirl mat 0.094 inch thick. This construction is then compacted into a composite sheet as described in Example 9 to make a 4″ x 8″ x 0.03″ plaque. The resultant composite sheet is 0.125 inch thick and was composed of two layers of fiberglass mat reinforcement bound between layers of thermoplastic polyarylene polyether.

The composite sheet is formed against a copper original to form a matrix as in Example 2. Reproduction is excellent and shrinkage is less than 0.3%, uniform in all directions. A duplicate plate is successfully molded against the matrix as described in Example 2. Reproduction is excellent and the matrix shows no thermal or dimensional degradation.

What is claimed is:

1. A reformable, thermoplastic matrix against which polymeric material can be molded to produce printing plates and the like formed from a sheet of thermoplastic polyarylene polyether composed of recurring units having the formula

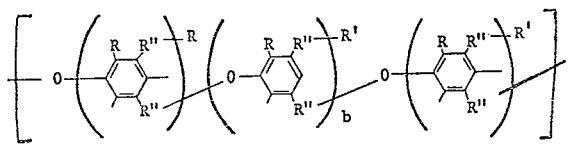

wherein the free valence of the terminal oxygen atom of one unit is connected to the free valence of the terminal benzene nucleus of the adjoining unit, b is an integer of from 0 to 1 inclusive, R is a monvalent substituent selected from the group of hydrocarbon radicals, halohydrocarbon radicals having at least 2 carbon atoms, alkoxy radicals, and haloalkoxy radicals having at least 2 carbon atoms, R' and R'' are the same as R and in addition hydrogen, said matrix exhibiting uniform mold shrinkage in all directions of 0.7% and less, and characterized by being thermally and dimensionally stable at molding temperatures of up to 350° F.

2. Matrix of claim 1 wherein said polyarylene polyether is composed of recurring units having the formula

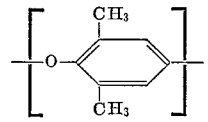

3. A reformable, thermoplastic matrix against which polymeric material can be molded to produce printing plates and the like formed from a sheet comprising at least one fibrous layer bound between layers of thermoplastic polyarylene polyether composed of recurring units having the formula

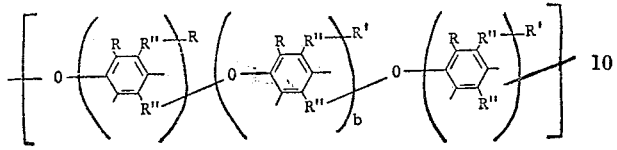

wherein the free valence of the terminal oxygen atom of one unit is connected to the free valence of the terminal benzene nucleus of the adjoining unit, $b$ is an integer of from 0 to 1 inclusive, R is a monovalent substituent selected from the group of hydrocarbon radicals, halohydrocarbon radicals having at least 2 carbon atoms, alkoxy radicals, and haloalkoxy radicals having at least 2 carbon atoms, R' and R'' are the same as R and in addition hydrogen, said matrix exhibiting uniform mold shrinkage in all directions of 0.7% and less, and characterized by being thermally and dimensionally stable at molding temperatures of up to 350° F., the thickness of said thermoplastic polyarylene at the surfaces of the composite sheet being thicker than the deepest impression made into it during the formation of a matrix.

4. Matrix of claim 3 wherein said polyarylene polyether is composed of recurring units having the formula

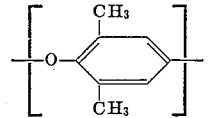

References Cited
UNITED STATES PATENTS

| | | | |
|---|---|---|---|
| 2,272,254 | 2/1942 | Swan | 161—400 X |
| 2,278,291 | 3/1942 | Swan | 117—5.1 X |
| 2,509,499 | 5/1950 | Higgins | 161—260 X |
| 2,703,051 | 3/1955 | Richardson | 161—264 X |
| 3,238,086 | 3/1966 | Tompkins | 161—400 X |
| 3,238,087 | 3/1966 | Norwalk et al. | 161—185 |
| 3,332,909 | 7/1967 | Farnham et al. | 260—47 |

EARL M. BERGERT, *Primary Examiner.*

H. ANSHER, *Assistant Examiner.*